(12) United States Patent
Pop (10) Patent No.: US 9,063,250 B2
(45) Date of Patent: Jun. 23, 2015

(54) INTERFERENCE TESTING WHILE DRILLING

(75) Inventor: Julian J. Pop, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1070 days.

(21) Appl. No.: 12/858,835

(22) Filed: Aug. 18, 2010

(65) Prior Publication Data

US 2011/0199862 A1    Aug. 18, 2011

Related U.S. Application Data (60) Provisional application No. 61/234,761, filed on Aug. 18, 2009.

(51) Int. Cl.
| | |
|---|---|
| *G01V 3/00* | (2006.01) |
| *E21B 47/00* | (2012.01) |
| *E21B 49/00* | (2006.01) |
| *C09K 8/02* | (2006.01) |
| *G01V 1/40* | (2006.01) |

(52) U.S. Cl.
CPC ............... *G01V 1/40* (2013.01); *E21B 49/008* (2013.01)

(58) Field of Classification Search
USPC ............ 340/853.1–856.4; 367/25–35; 702/6–13; 175/24, 25, 38, 48, 50, 72; 166/336, 245, 252.5, 250.02, 313, 52
See application file for complete search history.

(56) References Cited

U.S. PATENT DOCUMENTS

| | | | |
|---|---|---|---|
| 3,807,502 A | 4/1974 | Heilhecker et al. | |
| 3,957,118 A | 5/1976 | Barry et al. | |
| 4,126,848 A | 11/1978 | Denison | |
| 4,475,591 A * | 10/1984 | Cooke, Jr. | 166/254.1 |
| 4,605,268 A | 8/1986 | Meador | |
| 4,806,928 A | 2/1989 | Veneruso | |
| 4,901,069 A | 2/1990 | Veneruso | |
| 5,052,941 A | 10/1991 | Hernandez-Marti et al. | |

(Continued)

FOREIGN PATENT DOCUMENTS

| | | |
|---|---|---|
| RU | 2040691 | 7/1995 |
| RU | 2140527 | 12/1997 |
| WO | 90/14497 | 11/1990 |

OTHER PUBLICATIONS

Adeyemi et al., Optimizing Well Test Sequence and Duration Using Real-Time Pressure Transient Analysis (RT-PTA), 2005 International Petroleum Technology Conference.*

(Continued)

*Primary Examiner* — Mohammad Ghayour
*Assistant Examiner* — Jerold Murphy
(74) *Attorney, Agent, or Firm* — Mark D. Shelley, II (57) ABSTRACT

A method and apparatus configured to perform an interference test while drilling, including the steps of computing a pressure history response at a monitoring well from a pulsing of a well remote to the monitoring well, determining a time interval and a location for conducting a pressure test along a monitoring well trajectory based on the computing of the pressure history response, initiating a pulsing of the well remote to the monitoring well, determining whether pressure data should be taken at the monitoring well, estimating a near wellbore pressure effect at the monitoring well if the pressure data is taken, adjusting a mud circulation flow rate in the monitoring well if the pressure data is taken, and measuring at least one pressure value at the monitoring well if the pressure data is taken.

16 Claims, 6 Drawing Sheets

(56) References Cited

U.S. PATENT DOCUMENTS

| | | | |
|---|---|---|---|
| 5,278,550 | A | 1/1994 | Rhein-Knudsen et al. |
| 5,531,592 | A | 7/1996 | Tasi |
| 5,663,499 | A * | 9/1997 | Semmelbeck et al. ..... 73/152.06 |
| 5,971,072 | A | 10/1999 | Huber et al. |
| 6,174,001 | B1 | 1/2001 | Enderle |
| 6,641,434 | B2 | 11/2003 | Boyle et al. |
| 6,866,306 | B2 | 3/2005 | Boyle et al. |
| 6,986,282 | B2 | 1/2006 | Ciglenec et al. |
| 7,063,174 | B2 | 6/2006 | Chemali et al. |
| 2008/0066535 | A1* | 3/2008 | Vasques et al. ............ 73/152.17 |
| 2009/0126475 | A1* | 5/2009 | Zhang et al. ............... 73/152.05 |
| 2011/0127085 | A1* | 6/2011 | Partouche ....................... 175/57 |

OTHER PUBLICATIONS

Bunn, G.F. et al., Design, Implementation, and Interpretation of a "Three-Dimensional Well Test" in the Cormorant Field, North Sea, SPE 15858, London, Oct. 20-22, 1986.

Hammond, P.S. et al., Correcting Supercharging in Formation-Pressure Measurements Made While Drilling, SPE 95710, Dallas, TX, Oct. 9-12, 2005.

Saeedi, J. et al., Layer Pulse Testing Using a Wireline Formation Tester, SPE 16803, Dallas, TX, Sep. 27-30, 1987.

Bunn, et al. "Distributed Pressure Measurements Allow Early Quantification of Reservoir Dynamics in the Jene Field," SPE 17682, SPE Formation Evaluation, vol. 6(01), Mar. 1991, pp. 55-62.

Kaneda et al. "Interpretation of a Pulse Test in a Layered Reservoir," SPE 21337, SPE Formation Evaluation, vol. 6, No. 4, Dec. 1991, pp. 453-462.

Lasseter, et al. "Interpreting an RFT-Measured Pulse Test with a Three-Dimensional Simulator," SPE 14878, SPE Formation Evaluation, vol. 3, No. 1, Mar. 1988, pp. 139-146.

McDonald "Four Different Systems Used for MWD," Oil and Gas Journal, vol. 76, No. 14, Apr. 3, 1978, pp. 115-116, 121-122 and 124.

Yaxley, et al. "A Field Example of Interference Testing Across a Partially Communicating Fault," SPE 19306, 1989, 41 pages.

* cited by examiner

INTERFERENCE TESTING WHILE DRILLING

CROSS-REFERENCE TO RELATED APPLICATIONS

This application claims the benefit of U.S. Provisional Application No. 61/234,761 entitled "Interference Testing While Drilling", filed Aug. 18, 2009, the entire disclosure of which is hereby incorporated by reference.

BACKGROUND OF THE DISCLOSURE

It is common for more than one well to be drilled in, through or about a reservoir. With the advent of processing systems and data analysis techniques, it is frequently advantageous to use interference and/or pulse testing to determine information about underground formations of the reservoir. For example, interference testing may be performed between pairs of wells where the monitor and/or pulsing well may be horizontal or vertical. In the case of horizontal wells, interference testing may predominantly provide areal connectivity information. In the case of vertical wells, interference testing may predominantly provide vertical connectivity information. Areal and/or vertical connectivity information may be used to evaluate permeability of the underground formations, and, for example, may be used to determine production strategies for the exploitation of the reservoir.

Obtaining information on geotechnical features using interference testing while drilling has been limited by communication difficulties between downhole tools and the surface. Conventionally, mud pulse telemetry is by far the most often used of the few techniques in commercial use for communication while drilling, between downhole equipment and the surface, thus problems remain in the industry. Unless otherwise indicated, references, throughout, to "while drilling," or the like, are intended to mean that the drill string is in the borehole or partially in the borehole as part of an overall drilling operation including drilling, pausing, and or tripping, and not necessarily that a drill bit is rotating.

In mud pulse telemetry, for example, data is transmitted as pressure pulses in the drilling fluid. Mud pulse telemetry, however, has well known limitations, including relatively slow communication, low data rates, and marginal reliability. Current mud pulse technology is capable of sending downhole data at only about twelve (12) digital bits per second. In many cases, this rate is insufficient to send all the data that is required to make real-time data acquisition and tool operating decisions, or this rate is limiting on the configuration of a desired tool string. Also, mud pulse technology does not work well in extended reach boreholes. Signaling from uphole to downhole, by regulating mud pump flow, in order to control processes such as directional drilling and tool functions, is also slow, and has a very low data transfer rate. Also, under certain circumstances, for example underbalanced drilling employing gases or foamed drilling fluid, current mud pulse telemetry systems cannot function.

There have been various attempts over the years to develop alternatives to mud pulse telemetry that are faster, have higher data communication rates, and do not require the presence of a particular type of drilling fluid. For example, acoustic telemetry has been proposed, which transmits acoustic waves through the drill string. Data communication rates are estimated to be approximately an order of magnitude higher than mud pulse telemetry, but these increased data communication rates are still limiting. Moreover, noise is a problem in these conventional systems. Another example is electromagnetic telemetry through the earth. This technique is considered to have limited range and depends on characteristics, especially resistivity, of the formations surrounding the borehole.

As alternative configuration, the placement of wires in drill pipes has been proposed to increase the data transmission rate. This proposal will carry signals throughout the drill pipe. Some early approaches to a wired drill string are disclosed in: U.S. Pat. No. 4,126,848, U.S. Pat. No. 3,957,118 and U.S. Pat. No. 3,807,502, and the publication "Four Different Systems Used for MWD," W. J. McDonald, The Oil and Gas Journal, pages 115-124, Apr. 3, 1978.

The idea of using inductive couplers, such as at the pipe joints, has also been proposed as another alternative. The following documents disclose use of inductive couplers in a drill string: U.S. Pat. No. 4,605,268, Russian Federation published patent application 2140527, filed Dec. 18, 1997, Russian Federation published patent application 2040691, filed Feb. 14, 1992, and WO Publication 90/14497A2, Also see: U.S. Pat. No. 5,052,941, U.S. Pat. No. 4,806,928, U.S. Pat. No. 4,901,069, U.S. Pat. No. 5,531,592, U.S. Pat. No. 5,278, 550, and U.S. Pat. No. 5,971,072.

U.S. Pat. No. 6,641,434 to Boyle et al. and U.S. Pat. No. 6,866,306 to Boyle et al., both assigned to the assignee of this application and incorporated by reference in their entirety, describe a wired drill pipe joint that is a significant advance in the wired drill pipe art for reliably transmitting measurement data in high-data rates, bidirectionally, between a surface station and locations in the borehole. The '434 and the '306 patents disclose a low-loss wired pipe joint in which conductive layers reduce signal energy losses over the length of the drill string by reducing resistive losses and flux losses at each inductive coupler. The wired pipe joint is robust in that it remains operational in the presence of gaps in the conductive layer. The performance attendant to these and other advances in the drill string telemetry art provides opportunity for innovation where prior shortcomings of range, speed, and data rate have previously been limiting on system performance.

Interference tests in established/producing reservoirs are often difficult to conduct and delicate measurements have to be performed under optimal circumstances. Very sensitive pressure gauges are placed in a quiet environment that is carefully controlled in order to measure the (invariably) small pulses induced by perturbing the production or injection schedule at a remote well. The pulse can take (many) hours, days, months and even years to develop and may be so smeared out that it is virtually indistinguishable from a background trend. The drilling environment tends to be very noisy so it is necessary to try and maximize the signal-to-noise ratio even though it may be very unfavorable.

DETAILED DESCRIPTION

It is to be understood that the following disclosure provides many different examples, for implementing different features of various embodiments. Specific examples of components and arrangements are described below to simplify this disclosure. These are, of course, merely examples and are not intended to be limiting. In addition, this disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
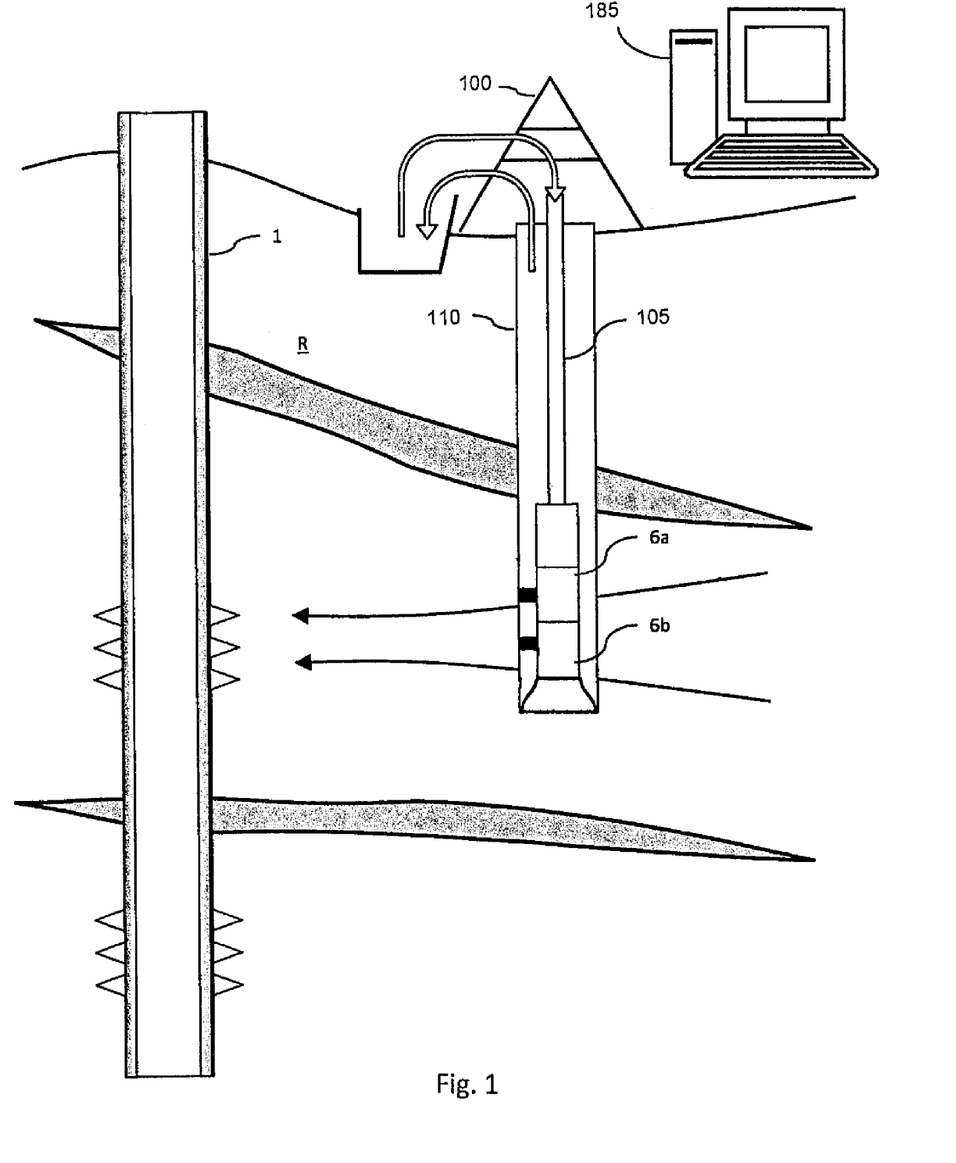
FIG. 1 illustrates a wellsite having a first well and a second well for interference testing.
Figure 5:
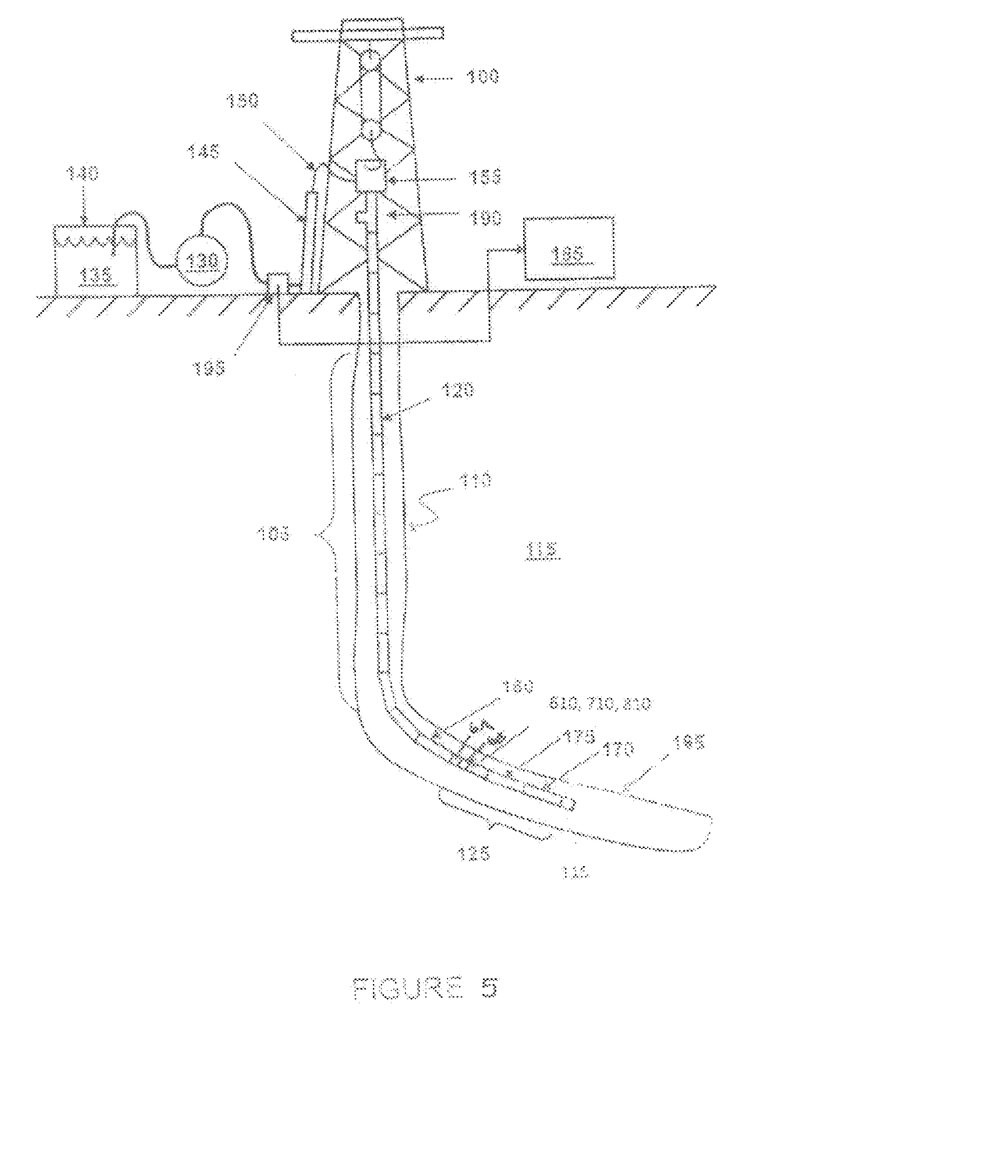
FIG. 5 illustrates a schematic diagram, including a partial cross-sectional view, of a drilling system having a wellbore telemetry device and a downhole tool connected to a drill string and deployed from a rig into a wellbore of the monitoring well.

An example well site system for performing interference testing, such as while drilling, is schematically depicted in FIGS. 1 & 5. The well site comprises a first well 1. In one non-limiting embodiment, the first well 1 may be a pulsed well, a remote producer and/or a remote injector type well. A drill rig 100 may be used to drill the first well 1 and a second well 110 into a reservoir R. In this embodiment, the second well 110 may be referred to as the monitoring well. A drill string 105 may extend from the drill rig 100 into zone of the formation of reservoir R. The drill string 105 may employ a telemetry system, described later, for transmitting data from downhole to the surface. The drill string 105 may employ any type of telemetry system or any combination of telemetry systems, such as electromagnetic, mud pulse, acoustic and/or wired drill pipe ("WDP"). In the case of WDP, it may be implemented using inductive couplers, as described in U.S. Pat. Nos. 6,641,434 and 6,866,306. A bottom hole assembly (BHA) is suspended at the end of the drill string 105. The BHA may comprise one or more tools, sensors or other components capable of measuring a characteristic of the second well 110, portions of the reservoir R surrounding the second well 110, and/or the drill string 105. In an embodiment, the BHA comprises a plurality of measurement while drilling (MWD) and/or logging while drilling (LWD) downhole tools 125, as illustrated in FIGS. 1 and 5, such as shown by numerals 6a and 6b. For example, one or more of the downhole tools 6a and 6b may be a formation pressure while drilling (FPWD) tool. The FPWD tool may be implemented as described in U.S. Pat. No. 6,986,282, which is hereby incorporated by reference in its entirety.

LWD tools used at the end of the drill pipe string 105 may include a thick-walled housing, commonly referred to as a drill collar, and may include one or more of a number of logging devices. Thus, the LWD tool may be capable of measuring, processing, and/or storing information therein, as well as communicating with equipment disposed at the surface of the wellsite.

MWD tools may include one or more of the following measuring tools: a weight-on-bit measuring device, a torque measuring device, a vibration measuring device, a shock measuring device, a stick slip measuring device, a direction measuring device, an inclination measuring device, and/or any other device. It is contemplated to incorporate one or more of the tools and/or other devices shown in FIGS. 1&5 with one or more aspects of the present disclosure.

Measurements made by the BHA or other tools and sensor(s) in communication with the drill string 105 may be transmitted to a surface computing system 185 for analysis. For example, wired drill pipe may be used to broadcast pressure measurements performed by one or more of the downhole tools 6a and 6b to the surface computing system 185.

The surface computing system 185 is configured to host a plurality of models, such as a reservoir model, a wellbore model of the second well 110, and to acquire and process the pressure data broadcasted via the WDP, as well as determine the BHA location in the reservoir R from MWD data. Examples of reservoir models and cross well interference testing may be found in the following references: "*Interpreting an RFT-Measured Pulse Test with a Three-Dimensional Simulator*" by Lasseter, T., Karakas, M., and Schweltzer, J., SPE 14878, March 1988. "*Design, Implementation, and Interpretation of a Three-Dimensional Well Test in the Cormorant Field, North Sea*" by Bunn, G. F., and Yaxley, L. M., SPE 15858, October 1986. "*Layer Pulse Testing Using a Wireline Formation Tester*" by Saeedi, J., and Standen, E., SPE 16803, September 1987. "*Distributed Pressure Measurements Allow Early Quantification of Reservoir Dynamics in the Jene Field*" by Bunn, G. F., Wittmann, M. J., Morgan, W. D., and Curnutt, R. C., SPE 17682, March 1991. "*A Field Example of Interference Testing Across a Partially Communicating Fault*" by Yaxley, L. M., and Blaymires, J. M., SPE 19306, 1989. "*Interpretation of a Pulse Test in a Layered Reservoir*" by Kaneda, R., Saeedi, J., and Ayestaran, L. C., SPE 19306, December 1991.

Although FIG. 1 depicts the second well 110 (the monitoring well), distinct from and the first well 1 (the remote pulsed well), the principle can be applied to pulsing a lateral off a main wellbore and monitoring in a new, remote lateral being drilled off the same main wellbore, for example, as in a "fishbone" case. Alternatively, the pulsing point and monitor point may be located on one wellbore but substantially separated. The BHA configuration could incorporate a pressure measurement probe which would be placed successively at different locations along the well bore; alternatively, multiple such probes may be located at various places along the BHA and/or repeaters located along the drill string 105 and set to record simultaneously.

Referring to FIG. 5, a schematic view of a portion of the example well site system partially depicted in FIG. 1, is illustrated. The illustrated portion may be positioned at the second (or monitoring) well 110. The derrick 100 or similar lifting device may be employed to move the drill string 105 within the second well 110 that is being drilled through subterranean formations of the reservoir, shown generally at 115 or R in FIG. 1. The drill string 105 may be extended into the second well 110 by threadedly coupling together, end to end, a number of coupled drill pipes (one of which is designated 120) of the drill string 105. The drill pipe comprising the drill string 105 may be structurally similar to ordinary drill pipes, as illustrated for example, in U.S. Pat. No. 6,174,001, issued to Enderle, entitled "Two-Step, a Low Torque, Wedge Thread for Tubular Connector," issued Aug. 7, 2001, which is incorporated herein by reference in its entirety, and includes a cable associated with each drill pipe 120 that serves as a communication channel. A cable in the drill pipe string may be any type of cable capable of transmitting data and/or signals, such as an electrically conductive wire, a coaxial cable, an optical fiber or the like.

The drill string 105 typically includes some form of signal coupling to communicate signals between adjacent drill pipes when coupled end to end, as illustrated. See, as a non-limiting example, the description of one type of wired drill pipe having inductive couplers at adjacent drill pipe collars in U.S. Pat. No. 6,641,434. However, one or more aspects of the present disclosure are not limited to the drill string 105 and can include other communication or telemetry systems, including a combination of telemetry systems, such as a combination of wired drill pipe, mud pulse telemetry, electronic pulse telemetry, acoustic telemetry or the like.

The BHA at the lower end of the drill string 105 may include one, an assembly, or a "string" of downhole tools. In the illustrated example, the downhole tool string may include well logging tool(s) 125 coupled to a lower end thereof. As used in the present description, the term "well logging tool" or a string of such tools, may include at least one or more logging while drilling tools, formation evaluation tools, formation sampling tools and/or other tools capable of measuring a characteristic of the subterranean formations of the reservoir 115 and/or of the second well 110.

Several of the components disposed proximate the derrick 100 may be used to operate components of the system. These components will be explained with respect to their uses in drilling the second well 110 for a better understanding thereof. The drill string 105 may be used to turn and axially urge a drill bit into the bottom of the second well 110 to increase its length (depth). During drilling of the second well 110, a pump 130 lifts drilling fluid ("mud") 135 from a tank 140 or pit and discharges the mud 135 under pressure through a standpipe 145 and flexible conduit 150 or hose, through a topdrive 155 and into an interior passage inside the drill pipe 105. The mud 135, which can be water- or oil-based, exits the wired drill pipe 105 through courses or nozzles (not shown separately) in the drill bit, where it then cools and lubricates the drill bit 116 and lifts drill cuttings generated by the drill bit to the surface of the earth through an annular arrangement.

When the second well 110 has been drilled to a selected depth, the well logging tools 125 may be positioned at the lower end of the wired drill pipe 105 if not previously installed. The well logging tools 125 may be positioned by pumping the well logging tools 125 down the wired drill pipe 105 or otherwise moving the well logging tools 125 down the wired drill pipe 105 while the wired drill pipe 105 is within the second well 110. The well logging tools 125 may be then coupled to an adapter sub 160 at the end of the drill string 105 and may be moved through, for example in the illustrated embodiment, a highly inclined portion 165 of the second well 110, which would be inaccessible using armored electrical cable ("wireline") to move the well logging tools 125.

During well logging operations, the pump 130 may be operated to provide fluid flow to operate one or more turbines (not shown in FIGS. 1 & 5) in the well logging tools 125 to provide power to operate certain devices in the well logging tools 125. However, when tripping in or out of the second well 110, it may be infeasible to provide fluid flow. As a result, power may be provided to the well logging tools 125 in other ways. For example, batteries may be used to provide power to the well logging tools 125. In one embodiment, the batteries may be rechargeable batteries that may be recharged by turbine(s) during fluid flow. The batteries may be positioned within a housing of one or more of the well logging tools 125. Other manners of powering the well logging tools 125 may be used including, but not limited to one time power use batteries.

As the well logging tools 125 are moved along the second well 110 by moving the wired drill pipe 105, signals may be detected by various devices, of which non-limiting examples may include a resistivity measurement device, a bulk density measurement device, a porosity measurement device, a formation capture cross-section measurement device 170 (not shown separately), a gamma ray measurement device 175 and a formation fluid sampling tool 610, 710, 810 which may include a formation fluid pressure measurement device 6a and/or 6b. The signals may be transmitted toward the surface of the earth along the drill string 105.

An apparatus and system for communicating from the drill pipe 105 to the surface computer system 185 or other component configured to receive, analyze, and/or transmit data includes a second adapter sub 190 that may be coupled between an end of the drill string 105 and the topdrive 155 that may be employed to provide a wired or wireless communication channel or path with a receiving unit 195 for signals received from the well logging tools 125. The receiving unit 195 may be coupled to the surface computer system 185 to provide a data path therebetween that may be a bidirectional data path.

Though not shown, the drill string 105 may alternatively be connected to a rotary table, via a kelly, and may suspend from a traveling block or hook, and additionally a rotary swivel. The rotary swivel may be suspended from the derrick 100 through the hook, and the kelly may be connected to the rotary swivel such that the kelly may rotate with respect to the rotary swivel. The kelly may be any matched set of polygonal or splined outer surface pipe that mates to a kelly bushing such that actuation of the rotary table may rotate the kelly.

An upper end of the drill string 105 may be connected to the kelly, such as by threadingly connecting the drill string to the kelly, and the rotary table may rotate the kelly, thereby rotating the drill string connected thereto. As such, the drill pipe string 105 may be able to rotate with respect to the hook. Though a rotary drilling system is shown in FIGS. 1&5, other drilling systems may be used without departing from the scope of the present disclosure.

Though not shown, the drill string 105 may include one or more stabilizing collars. A stabilizing collar may be disposed within and/or connected to the drill string 105, in which the stabilizing collar may be used to engage and apply a force against the wall of the second well 110. This may enable the stabilizing collar to prevent the drill pipe string 105 from deviating from the desired direction for the second well 110. For example, during drilling, the drill string 105 may "wobble" within the second well 110, thereby allowing the drill string 105 to deviate from the desired direction of the second well 110. This wobble action may also be detrimental to the drill string 105, components disposed therein, and the drill bit 116 connected thereto. A stabilizing collar may be used to minimize, if not overcome altogether, the wobble action of the drill string 105, thereby possibly increasing the efficiency of the drilling performed at the wellsite and/or increasing the overall life of the components at the wellsite.

Figure 2A:
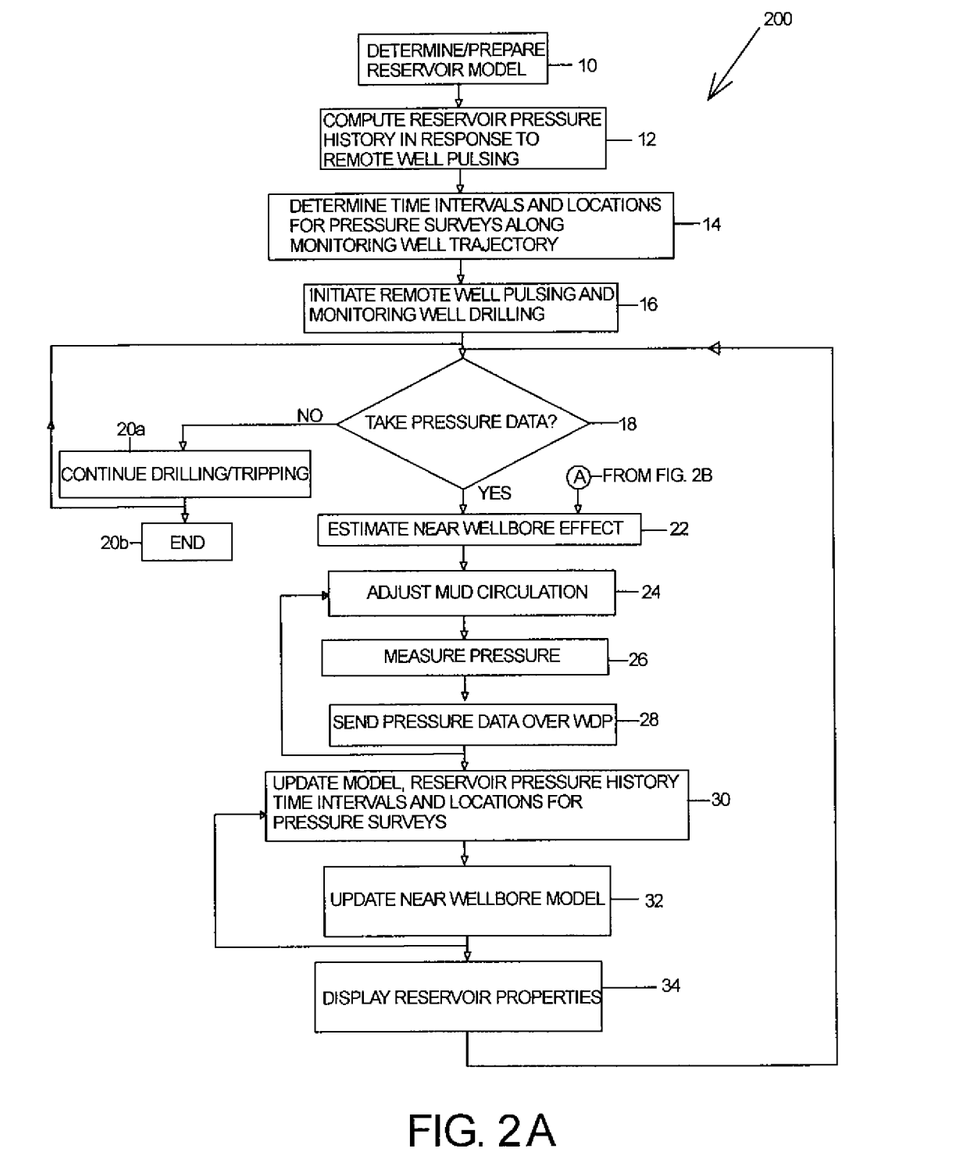
FIG. 2A illustrates a flow chart of a method for performing interference testing while drilling.
Figure 2B:
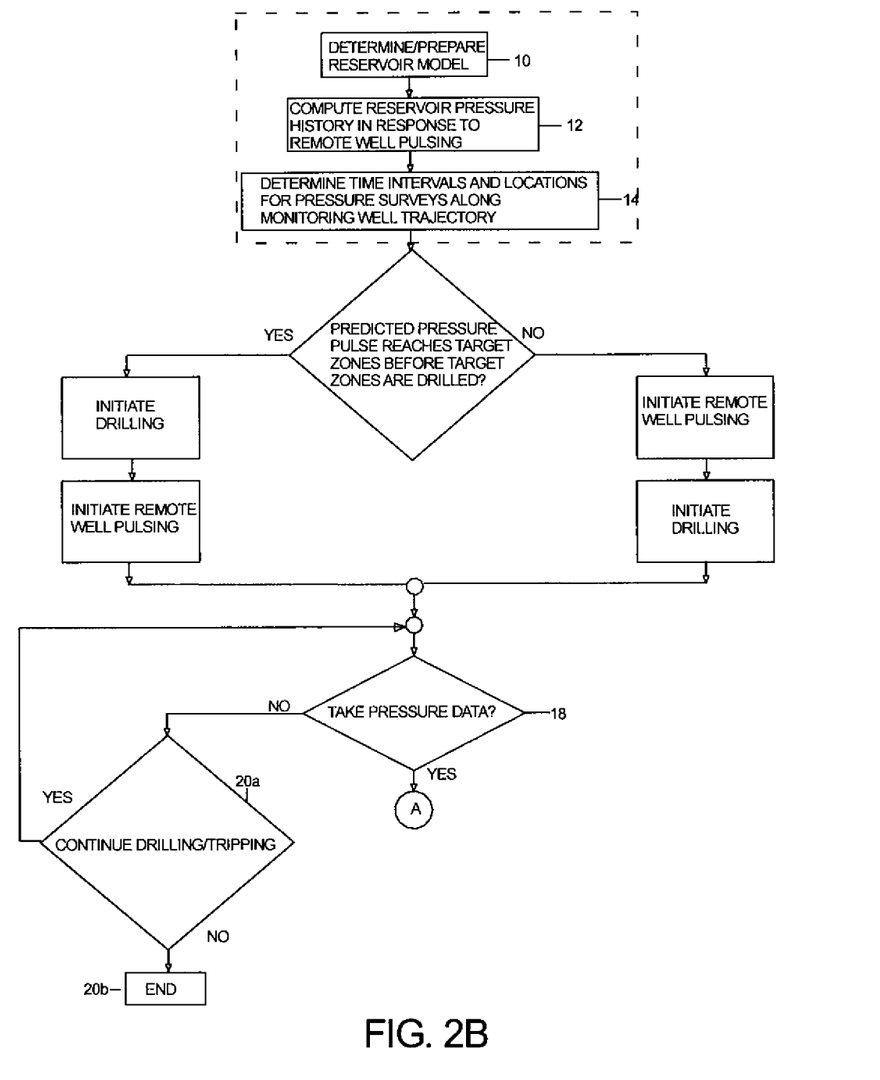
FIG. 2B illustrates an alternative embodiment of a method for performing interference testing while drilling.
Figure 3:
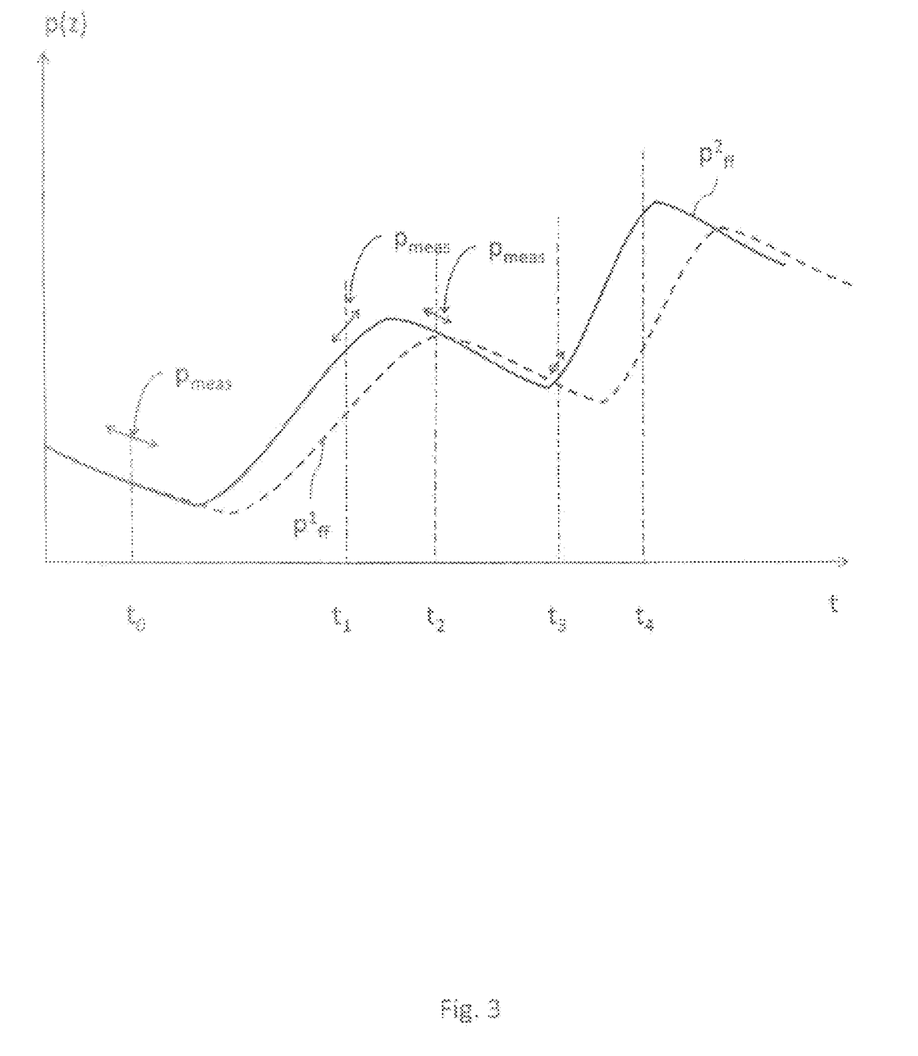
FIG. 3 illustrates a curve of a predicted pressure response of the reservoir at the drill depth along the trajectory of the monitoring well.

Example flow charts of methods 200 for performing interference testing while drilling are depicted in FIGS. 2A and 2B. Although described above as being applicable to a single pulsed well, the method, described above, may be used in any number of pulsed wells. At step 10, a reservoir model is determined. For example, the reservoir model may be determined or developed from one or more of a seismic survey of the reservoir, a gravimetric survey of the reservoir, electromagnetic and/or geologic surveys of the reservoir, a production history match of existing wells in the reservoir, as well as logs of existing wells in the reservoir. This model may be stored in the computer system 185. At step 12, the pressure response of the reservoir to pulsing a remote well (such as the first well 1 in FIG. 1) is simulated. Various pulse histories may be computed and compared to maximize the chances of observing an effect at the newly drilled monitoring well. Also, the pulse history may be adjusted to the drilling program of the monitoring well (such as the second well 110 in FIG. 1). For example, the pulse history may be adjusted so that a particular pressure feature propagates and reaches the monitoring well when the drilling of the monitoring well has sufficiently progressed. At step 14, time intervals and locations for the surveys are determined. The time intervals for conducting surveys may be selected to identify, at the monitoring well, a rapidly changing pressure pulse, and/or a maximum pulse amplitude and the most advantageous times to perform the measurements. For example, FIG. 3 shows a curve $p^1_{\mathit{ff}}(t,z)$ of a predicted pressure response of the reservoir at the drill depth z along the trajectory of the monitoring well. Based on FIG. 3, the time intervals $t_0$, $t_1$, $t_2$ and $t_3$ may initially be selected. The selection of time intervals for conducting surveys, however, may also be updated as the monitoring well is drilled, as further described below. The pressure response, as depicted in FIG. 3, is for illustration purposes only and applies primarily to reservoirs where the mobility is sufficiently high that several "pulses" may be propagated during the duration of drilling and/or testing. For reservoirs having a lower mobility, the entire test may appear more like what appears in FIG. 3 as taking place during the time interval [t0, t1] resulting from a single change in the remote well flow rate. The former type of test is commonly referred to as a pulse test whereas the latter is generally designated an interference test. The most appropriate type of test to be performed will be determined at step 12 in FIGS. 2A and 2B. For convenience in presentation, propagating pressure disturbances will be referred to as pulses whether they arose from an interference-like test or a pulse-like test.

At step 16 in FIG. 2A, the pulsing of the remote well (for example remote well 1) and the drilling of the monitoring well (for example monitoring well) are initiated. These two events may be synchronized (and not necessarily simultaneous). If it is determined at step 14 that the optimal time to measure the pulse in the monitor well at the planned sequence of depths would occur prior to the planned test depths being drilled when the pulsing of the remote well and the drilling of the monitoring well were initiated simultaneously, FIG. 2B illustrates that the drilling of the monitor well may be initiated, at step 16a, and the initiation of the pulsing of the remote well may be delayed to achieve the optimal measured response, at step 16b. Alternatively, if it is determined at step 14 that the optimal time to measure the pulse in the monitor well at the planned sequence of test depths would occur after the planned time allotted for drilling operations in the monitor well when the pulsing of the remote well and the drilling of the monitoring well were initiated simultaneously, the pulsing of the remote well may be initiated, step 16c, prior to the scheduled start of the drilling of the monitor well, step 16d, so as to achieve the optimal pressure responses at the depths to be tested, as shown in FIG. 2B.

At step 18, a determination is made of whether a pressure survey should be performed. This determination may be made by an operator or a computer system, as a non-limiting example. This determination may be based on time intervals calculated or chosen and at locations determined at step 14, as well as pressure surveys previously performed in the portion of the well already drilled. For example, the drilling may be momentarily suspended and the BHA may be moved in the wellbore so that the pressure monitoring probes are aligned with the desired locations of the survey. If not, drilling operations may continue at step 20a.

At step 22, near wellbore pressure effects (for example, supercharging) may be estimated, under various testing conditions such as pumps off measurements, pumps on measurements, etc. An example of a model that can be used to determine near wellbore effects due to mud filtration in the monitoring wellbore can be found in "*Correcting Supercharging in Formation-Pressure Measurements Made While Drilling*" by P. S. Hammond, and J. J. Pop, SPE 95710, October 2005. For example, the expected sandface pressure as measured by a FPWD tool or a pressure monitoring probe at a location z and around a time $t_i$, $p_{sf}(t,z)$, may be expressed as:

$$p_{sf}(t,z)=p_{\mathit{ff}}(t,z)+s(t,z) \tag{Eq. 1}$$

where $p_{\mathit{ff}}(t,z)$ is the pressure response of the reservoir at the location z and time t due to pulsing the remote well (and the superposed effect of any other producing/injection wells active in the reservoir, referred to as a "background" pressure trend herein after) as computed at step 12, and s(t,z) is a near wellbore contribution (such as supercharging) computed using a local model of the monitoring well utilizing $p_{\mathit{ff}}(t,z)$ as the far field pressure. In an alternative embodiment, a pre-existing data or record of the pressure at the monitoring well in the absence of initiation of the pulse sequence in the pulsing well may be used in order to establish the "background" pressure trend. In this alternative, the "background" pressure trend would be subtracted from the pressures in Eq. 1 thereby facilitating the interpretation of the propagated disturbance. Depending on the mobility of the reservoir being interrogated, such data and/or records may not be available, but the alternative remains if such data and/or records exist.

The near wellbore contribution s(t,z) may include transient effects due to variations in filtration rate, dissipation of pressure in the formation, variations in the mudcake properties such as due to compaction, erosion, as non-limiting factors. The amplitude of the supercharging effect and its temporal behavior depends on the details of the testing procedure, such as turning the circulation pumps in the monitoring well off or turning the pumps on during testing. For example, if the mud circulation rate is maintained relatively constant, the supercharging may be large in magnitude, but relatively constant (little transient effect). In this case, the temporal variation in pressure measured at the sand face $\partial p_{sf}(t,z)/\partial t$ would be close to the pressure variation in the far field, and thus, close to $\partial p_{\mathit{ff}}(t,z)/\partial t$ provided that the model used for determining $p_{\mathit{ff}}(t,z)$ is correct. If mud circulation is interrupted or changed, the supercharging s(t,z) may exhibit a large initial transient, but after the transient has dissipated, it is expected to reach a new, relatively constant level, appropriate to the new circulation rate. This is the case even if the circulation pumps are turned completely off. In the latter case, depending on the quality of the mud cake deposited and the ability of the formation to dissipate the supercharging pressure, the pressure measured at the sand face $p_{sf}(t,z)$ may be close to the far field pressure and thus, close to $p_{\mathit{ff}}(t,z)$ provided that the model used for determining $p_{\mathit{ff}}(t,z)$ is correct.

Based on the evaluation of the expected near wellbore effects performed at step 22, mud circulation rates and station times may be adjusted at step 24 for the monitoring well. A measurement of sandface pressures is performed by one or more FPWD or pressure monitoring probes at step 26. The measurement data are broadcast at a high rate and high precision at step 28. The operations of steps 24, 26 and 28 may be repeated for different mud circulation rates, if desired, by the operator.

At step 30, the near wellbore effect may be detected and accounted for. For example, measurements performed using operations that minimize near wellbore transient effects may be used to estimate the rate of change rate of the far field. The transmitted data may benefit from high data density and precision to be useful for determining changes in pressure and their rates of change. Alternatively or additionally, the broadcast data may be examined to verify if near wellbore effects have dissipated during operations that have been employed to minimize such effects. The broadcast data may benefit from high data density and precision to differentiate dissipation effects from variations in the far field pressure caused by pulsing the remote well.

Furthermore, at step 30, the reservoir model (used at step 10) may be updated. Referring to the example graph of FIG. 3, the updated model may have different reservoir properties and may predict a pressure response $p^2_{ff}(t,z)$ different from the initially estimated pressure response $p^1_{ff}(t,z)$. The new response may be in better agreement (for example the pressure change may match better when the near wellbore effects can be considered to be constant) than the initial model. Updated testing time intervals may also be determined at step 30 based on the new model, as indicated by $t_4$ in FIG. 3.

Figure 4:
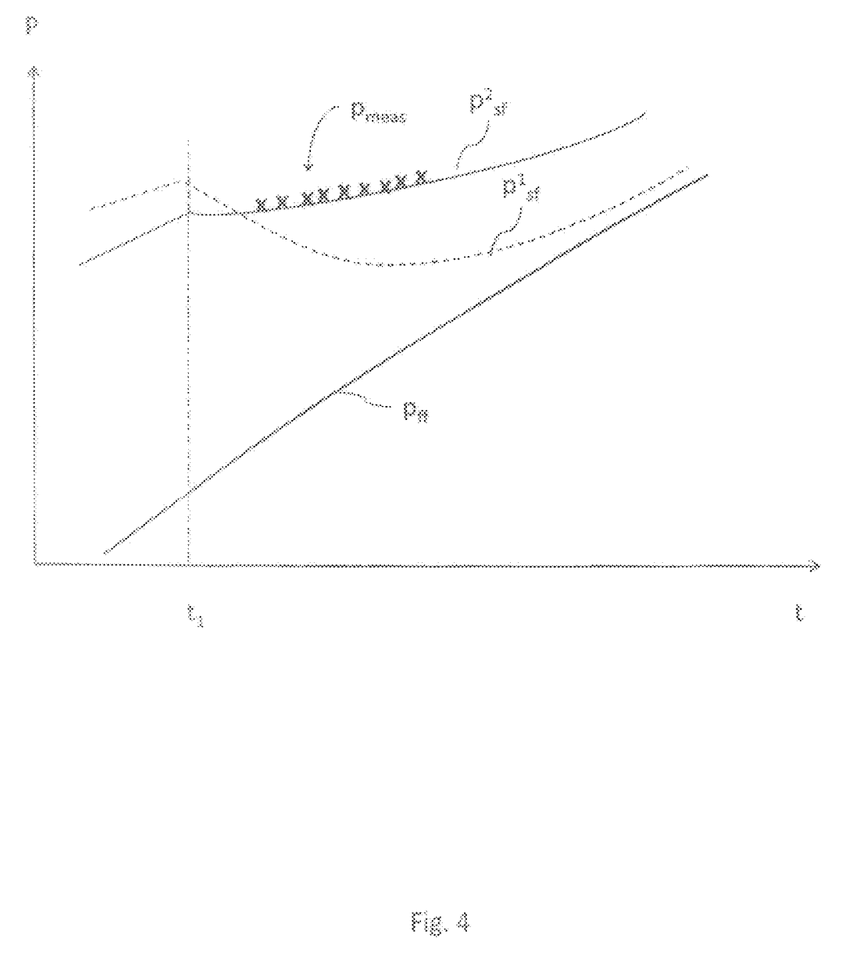
FIG. 4 is an example graph illustrating an estimate of the sandface pressure derived from a supercharging pressure as compared with the measured pressure data.

At step 32, the model used to estimate near wellbore effects at step 22, for example supercharging, may also be updated. Assuming the far field model $p_{ff}(t,z)$ is correct, the supercharging pressure $s(t,z)$, for example, may be computed under a first assumption of the properties of the mudcake/mudcake growth history, as well as hydraulic history in the monitoring well. Referring, for example, to the graph of FIG. 4, a first estimate of the sandface pressure $p^1_{sf}$ derived from the supercharging pressure $s(t,z)$ may be compared with the measured pressure data $p_{meas}$. The mudcake/mudcake growth history may be updated, and a new sandface pressure $p^2_{sf}$ in better agreement with the measured pressure data $p_{meas}$ may be used.

The operations described in steps 30 and 32 may be repeated, as desired. Also, the operations described in steps 22, 24, 30 and 32 may be omitted, rearranged and/or performed in different order. At step 34, the reservoir properties utilized in the updated model may be displayed, and/or used by an operator to determine subsequent drilling and/or monitoring operations. The method may be repeated for several pressure surveys, which may, for example, consists of multiple pressure stations, along a drilled well performed at various times during the drilling operation. Additionally, the entire testing process may be executed over several drilling or tripping runs as is found necessary for the collection of the desired data. Drilling and testing operations may end at step 20b.

Since pulsing wells and monitoring wells are usually spaced relatively far apart, there may be substantial latency between the time the remote well is pulsed and the time pressure signals generated by pulsing the remote well are measured at the monitoring well. According to one or more aspects of the present disclosure, it may be therefore beneficial to simulate/model the interference test before the pressure while drilling tool is deployed in order to predict the range of times over which the pressure measurements should be acquired and to update the simulation/model during testing. In a drilling environment there is very little time to perform measurements with the BHA stationary and/or the rigs pumps off so, according to one or more aspects of the present disclosure, the optimal time or times to acquire pressure data may be chosen based on the simulation/modeling of the interference test performed before the pressure while drilling tool is deployed. Moreover, the data acquisition strategy—which may have been one long quiet period for the non-drilling case—may have to be broken up into a plurality of shorter periods tolerable to the driller. It may be noted that the pressure monitoring tool will be allowed to remain stationary for the complete duration of the pulsing sequence at the monitoring well since this could take many hours. A possible alternative in accordance with one or more aspects of the present disclosure would be to perform a series of pressure surveys at various locations along the well trajectory and time intervals during drilling the monitoring well. The locations/time intervals may be based on the results of simulation/modeling of the interference test, and may be updated during testing/drilling the well as the model parameters are updated.

Since the pressure signals generated by pulsing the remote well could be quite small at the monitoring well, it may be advantageous to turn off the circulation pumps used when drilling the monitoring well during pressure monitoring (to limit the hydraulic noise). However, turning off the circulation pumps may give rise to a transient in the sandface pressure as the mud cake reestablishes itself which may not dissipate/stabilize quickly enough to be neglected. This transient may compete with the (usually small) pressure signal generated by the perturbing well and measured at the monitor well. In accordance with one or more aspects of the present disclosure, the characteristics of the transient caused by turning the pumps off may be estimated using a near wellbore supercharging model. Thus, the advantages of pumps off versus pumps on test can be addressed based on the results of the interference test simulation and the near wellbore supercharging model, and the test may be performed accordingly. Details of how the test should be performed can be addressed in a planning phase prior to drilling the monitor well using values for the simulation parameters obtained through local knowledge or data acquired in near-by wells. These parameters may be updated during the drilling and testing of the monitor well.

According to one or more aspects of the present disclosure, the use of wired drill pipe with interference testing may be used to gather information between two wells during drilling of one of the wells that may provide information to improve the drilling process of that well. As another example, it may be advantageous to perform interference testing as early as possible in the life of a reservoir, for example, as the monitoring well is being drilled. In this case, the pressure measured by the formation pressure while drilling tool may be the superposition of a near wellbore pressure perturbation caused by transient and/or stationary supercharging effects, and the pressure signals generated by pulsing the remote well.

Wired Drill Pipe (WDP) telemetry may be beneficial to this application since the data rate and resolution available with WDP are required to be able to "see" both the pressure signal generated by pulsing the remote well and the transient in the sandface pressure as the mud cake reestablishes itself. Substantial smearing of the pulse transmitted from the remote well may take place, and therefore, pressure measurements of sufficient resolution (e.g. 0.01 psi or better) may be needed to identify the pulse transmitted from the remote well. In addition, transient in the sandface pressure as the mud cake reestablishes itself have a characteristic time of (at the very least several, if not tens of) minutes. Thus, high resolution and fast data sampling rate may be advantageous, and a high data rate telemetry (such as provided by WDP) is needed to broadcast the pressure measurement data.

The broadcasted pressure measurement data may then be interpreted in view of the simulation/modeling of the interference test, locations and time intervals at which the measurement were performed, and optionally in view of the estimated characteristics of the transient caused by turning the pumps off (if applicable). Usually, the simulation/modeling of the interference test and the locations at which the measurement were taken are stored on a surface computing system. Thus, the WDP will usually be used to broadcast the pressure measurement data to the surface computing system.

The computing system 185 may then be used to estimate if a transient in the sandface pressure as the mud cake reestablishes itself is present in the pressure measurement data. If needed, the transient can be accounted for. The characteristics of the formation region between the pulsing and monitoring well may be updated in the interference test model based on the pressure measurement data corrected for near wellbore effect, such as the transient in the sandface pressure caused by the mudcake reestablishing itself.

In one example embodiment, a method is described having the steps of computing a pressure history response at a monitoring well from a pulsing of a well remote to the monitoring well, determining a time interval and a location for conducting a pressure test along a monitoring well trajectory based on the computing of the pressure history response, initiating a pulsing of the well remote to the monitoring well, determining whether pressure data should be taken at the monitoring well, estimating a near wellbore pressure effect at the monitoring well if the pressure data is taken, adjusting a mud circulation flow rate in the monitoring well if the pressure data is taken, and measuring at least one pressure value at the monitoring well if the pressure data is taken. In another embodiment, the method further comprises at least one of developing and retrieving a reservoir model wherein the at least one of developing and retrieving the reservoir model is determined from at least one of a seismic survey, a gravimetric survey and a production history. In another example embodiment, the method is accomplished wherein the initiating the pulsing of the well remote to the monitoring well is conducted such that the pulsing is synchronized with a drilling of the monitoring well. In another example embodiment, the method further comprises updating the reservoir model with the measured pressure value at the monitoring well. In another example embodiment, the method further comprises updating a near wellbore model. In another example embodiment, the method further comprises displaying the measured pressure value. In another example embodiment the method provides for the step of computing the reservoir pressure history which in turn is performed by pulsing a remote well and measuring a pressure, over time, at the monitoring well. The method may also be accomplished such that the initiating the pulsing of the well remote to the monitoring well involves more than one pressure pulse. The method may also be accomplished such that the measuring the at least one pressure at the monitoring well is performed while drilling the monitoring well. In another example embodiment the method may further comprise initiating the pulsing of the remote well in a time delay compared to the drilling of the monitoring well. In another example embodiment the method may comprise initiating the pulsing of the remote well prior to the drilling of the monitoring well. In another example embodiment the method may further comprise further adjusting the mud circulation rate. In another example embodiment, the method may further comprise adjusting a station evaluation time for the measuring the at least one pressure while adjusting the mud circulation. The method may also recite that the measuring the at least one pressure value is a sandface pressure measurement and may be measured by one downhole tool. The method may be accomplished such that the estimating the near wellbore pressure effect accounts for a supercharging. The method may also further comprise updating a mud cake growth history. The method may also provide for sending the at least one pressure value at the monitoring well to an operator.

In an alternative configuration, an apparatus is described. The apparatus is a drill string in a monitoring wellbore configured with at least one downhole tool for measuring and transmitting a formation fluid pressure from a pulsing well that is remote to the monitoring wellbore, a mud pump configured to provide a mud into the monitoring wellbore through the drill string, and a surface computing system configured to receive data transmitted from the at least one downhole tool, the surface computing system configured to host and update a reservoir model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for interference testing while drilling, comprising: computing a pressure history response at a monitoring well based on a reservoir model and before a pressure while drilling tool is deployed, wherein the response is computed by pulsing a well remote to the monitoring;
   determining a time interval and a location for conducting a pressure test along a monitoring well trajectory based on the computing of the pressure history response;
   initiating a pulsing of the well remote to the monitoring well;
   initiating drilling of the monitoring well;
   determining whether pressure data should be taken at the monitoring well;
   estimating a near wellbore pressure effect at the monitoring well, $P_{sf}(t, z)$, wherein the estimating of the near wellbore pressure effect is calculated by a formula of: $P_{sf}(t, z) = p_{ff}(t, z) + s(t, z)$, where $p_{ff}(t, z)$ is the pressure response of the monitoring well's reservoir at the location z and time t due to pulsing the remote well and $s(t, z)$ is a near wellbore contribution computed using a local model of the monitoring well utilizing $p_{ff}(t, z)$ as the far field pressure;
   adjusting a mud circulation flow rate in the monitoring well;
   measuring at least one pressure value at the monitoring well; and
   communicating the at least one pressure to a surface computing system via wired drill pipe whereby the pressure history response and the reservoir model are updated.

2. The method according to claim 1, further comprising:
   at least one of developing and retrieving a reservoir model, wherein the reservoir model is based on at least one of a seismic survey, a gravimetric survey and a production history.

3. The method according to claim 1, wherein the initiating the pulsing of the well remote to the monitoring well is conducted such that the pulsing is synchronized with a drilling of the monitoring well.

4. The method according to claim 1, further comprising:
   displaying the measured pressure value.

5. The method according to claim 1, wherein the computing the pressure history response is performed by pulsing a remote well and measuring a pressure, over time, at the monitoring well.

6. The method according to claim 1, wherein the initiating the pulsing of the well remote to the monitoring well involves more than one pressure pulse.

7. The method according to claim 1, wherein the measuring the at least one pressure at the monitoring well is performed while drilling the monitoring well.

8. The method according to claim 7, further comprising: initiating the pulsing of the remote well in a time delay compared to the drilling of the monitoring well.

9. The method according to claim 7, further comprising: initiating the pulsing of the remote well prior to the drilling of the monitoring well.

10. The method according to claim 1, further comprising: adjusting a station evaluation time for the measuring the at least one pressure while adjusting the mud circulation.

11. The method according to claim 1, wherein the measuring the at least one pressure value is a sandface pressure measurement.

12. The method according to claim 11, wherein the sandface pressure is measured by at least one formation pressure while drilling tool.

13. The method according to claim 1, wherein the estimating the near wellbore pressure effect accounts for a supercharging.

14. The method according to claim 1, further comprising: updating a mudcake growth history.

15. The method according to claim 1, further comprising: sending the at least one pressure value at the monitoring well to an operator.

16. An interference test apparatus, comprising:
a drill string in a monitoring wellbore configured with at least one downhole tool for measuring and transmitting a formation fluid pressure from a pulsing well that is remote to the monitoring wellbore wherein the drill string includes wired drill pipe to obtain both a pressure signal generated by the pulsing well and a transient in sandface pressure and a pressure while drilling tool;
a mud pump configured to provide a mud into the monitoring wellbore through the drill string; and
a surface computing system configured to receive data transmitted from the at least one downhole tool, the surface computing system configured to:
host and update a reservoir model,
compute, based on the reservoir model, and store a pressure history response of the monitoring wellbore and a near wellbore pressure effect at the monitoring wellbore from pulsing a well remote to the monitoring well and receive at least one pressure value sent from the downhole tool to the surface computing system whereby the pressure history response, the reservoir model and the near wellbore pressure effect are updated, the near wellbore pressure effect being calculated by a formula of: $P_{sf}(t, z) = p_{ff}(t, z) + s(t, z)$, where $p_{ff}(t, z)$ is the pressure response of the monitoring wellbore's reservoir at the location z and time t due to pulsing the remote well and $s(t, z)$ is a near wellbore contribution computed using a local model of the monitoring well utilizing $p_{ff}(t, z)$ as the far field pressure, and time and location intervals for measuring pressure signals are determined.

* * * * *